(12) United States Patent
McKinnell

(10) Patent No.: US 11,648,612 B2
(45) Date of Patent: May 16, 2023

(54) BREAK AWAY SUPPORT FOR 3D PRINTING

(71) Applicant: Hewlett-Packard Development Company, L.P., Spring, TX (US)

(72) Inventor: James Charles McKinnell, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 114 days.

(21) Appl. No.: 17/051,753

(22) PCT Filed: Sep. 29, 2018

(86) PCT No.: PCT/US2018/053654
§ 371 (c)(1),
(2) Date: Oct. 29, 2020

(87) PCT Pub. No.: WO2020/068133
PCT Pub. Date: Apr. 2, 2020

(65) Prior Publication Data
US 2021/0237161 A1 Aug. 5, 2021

(51) Int. Cl.
| | |
|---|---|
| *B33Y 50/02* | (2015.01) |
| *B22F 10/85* | (2021.01) |
| *B22F 10/14* | (2021.01) |
| *B22F 10/38* | (2021.01) |
| *B22F 10/47* | (2021.01) |
| *B33Y 30/00* | (2015.01) |

(52) U.S. Cl.
CPC .............. *B22F 10/85* (2021.01); *B22F 10/14* (2021.01); *B22F 10/385* (2021.01); *B22F 10/47* (2021.01); *B33Y 50/02* (2014.12); *B33Y 30/00* (2014.12)

(58) Field of Classification Search
CPC .................................................. B33Y 50/02
See application file for complete search history.

(56) References Cited

U.S. PATENT DOCUMENTS

| | | |
|---|---|---|
| 5,503,785 A | 4/1996 | Crump et al. |
| 6,869,559 B2 | 3/2005 | Hopkins |
| 10,005,239 B2 | 6/2018 | Versluys et al. |
| 2015/0250934 A1* | 9/2015 | Min ............... A61M 60/268 700/119 |
| 2016/0107380 A1 | 4/2016 | Smoot et al. |
| 2016/0122541 A1 | 5/2016 | Jaker et al. |
| 2016/0207263 A1 | 7/2016 | Gordon |
| 2017/0066197 A1 | 3/2017 | Morikawa et al. |
| 2017/0173697 A1 | 6/2017 | Myerberg et al. |

(Continued)

FOREIGN PATENT DOCUMENTS

| | | | |
|---|---|---|---|
| WO | WO-2017118806 A1 * | 7/2017 | ............. B22F 10/20 |
| WO | WO-2018049365 A1 | 3/2018 | |

*Primary Examiner* — Suresh Suryawanshi
(74) *Attorney, Agent, or Firm* — Michael Dryja

(57) ABSTRACT

In one example, a 3D printing system includes a support structure generator to identify a breakaway support to temporarily support part of the object, to design a wedge shaped groove between a portion of the object and the support, the groove ending at a line along which the support intersects the object, and to generate a digital object model that includes the support and the groove. The system also includes a 3D printer to print the object, support and groove based on the object model.

12 Claims, 7 Drawing Sheets

(56) References Cited

U.S. PATENT DOCUMENTS

2017/0232511 A1* 8/2017 Fieldman ............ B23K 26/342
  419/7
2018/0154438 A1* 6/2018 Mark .................... B29C 64/165
2018/0154440 A1   6/2018 Gibson et al.
2018/0154441 A1   6/2018 Miller et al.
2018/0348070 A1* 12/2018 Wang ...................... G01K 1/14

* cited by examiner

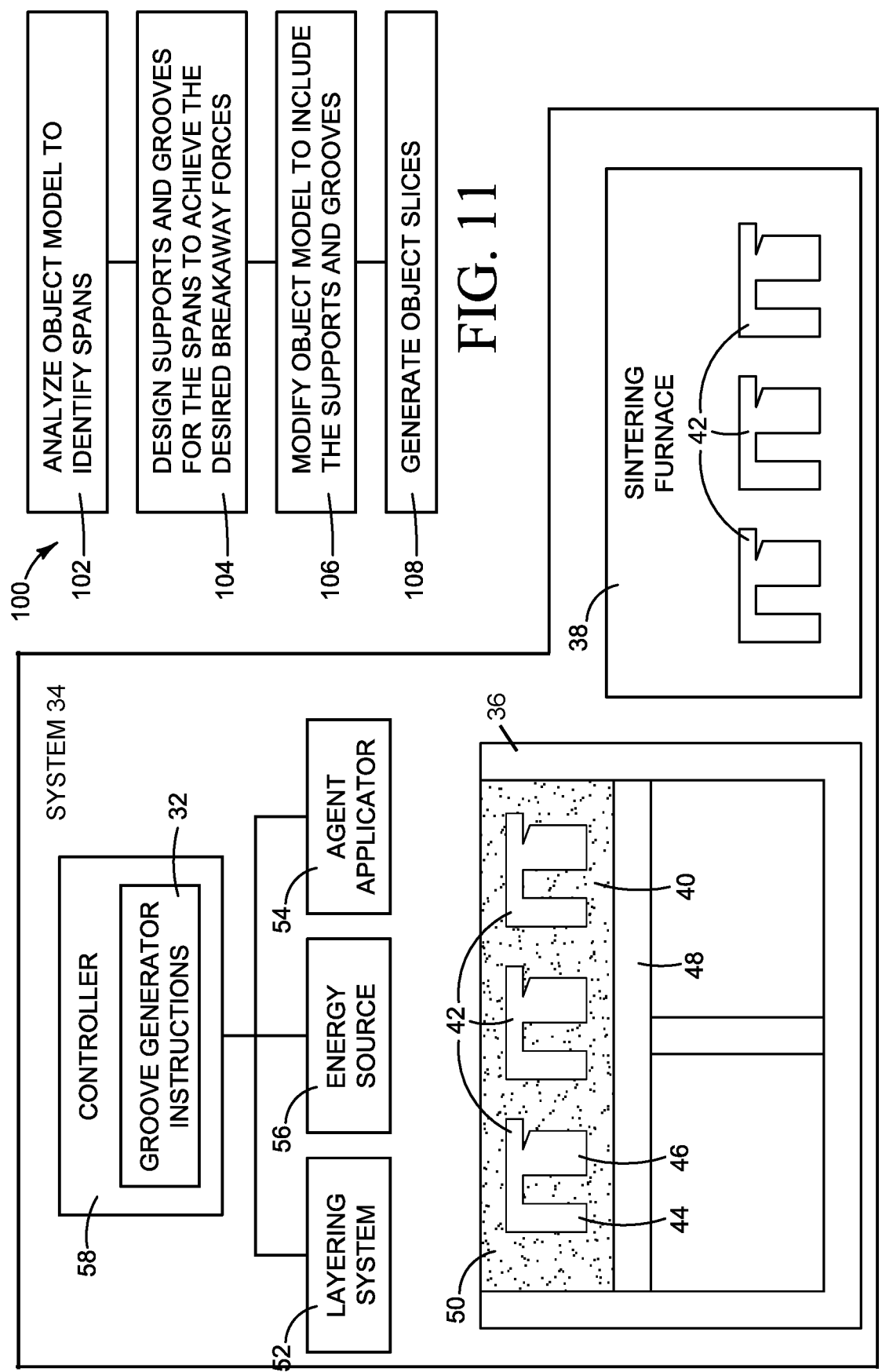

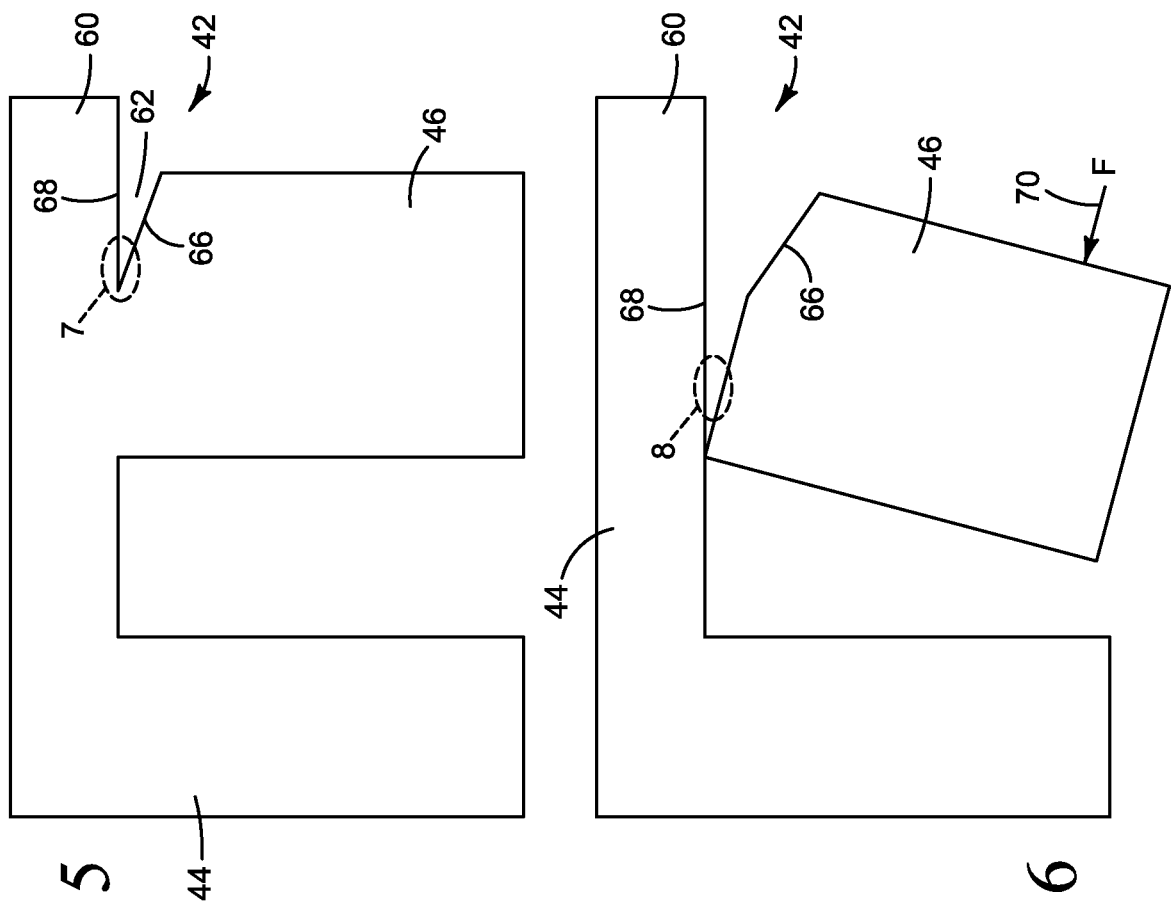
FIG. 5
FIG. 6
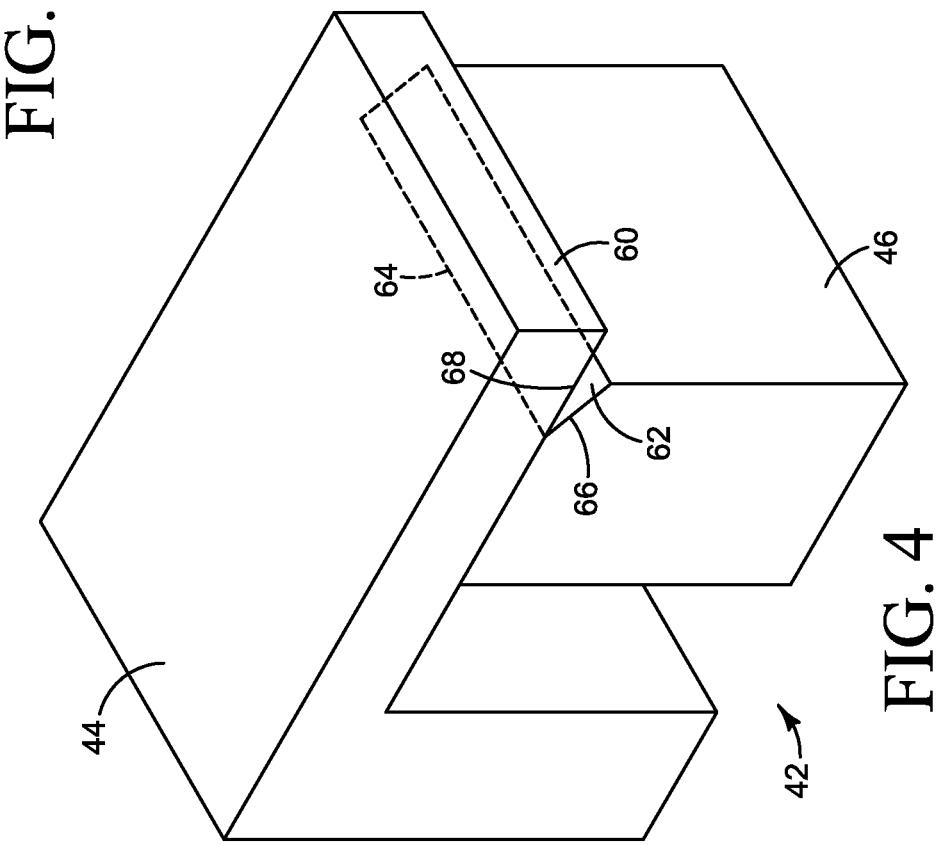
FIG. 4

BREAK AWAY SUPPORT FOR 3D PRINTING

BACKGROUND 3D printers convert a digital representation of an object into the physical object. 3D printers are used to manufacture objects with complex geometries using a variety of materials including thermoplastics, polymers, ceramics and metals. In powder based 3D printing, successive layers of a powdered build material are formed and portions of each layer solidified in a desired pattern to build up the layers of the 3D object.

DRAWINGS

FIG. 3 illustrates an example additive manufacturing system with a 3D printer to print green parts and a sintering furnace to sinter the green parts.

FIGS. 4-6 illustrate an example object structure with a breakaway support.

Figure 9:
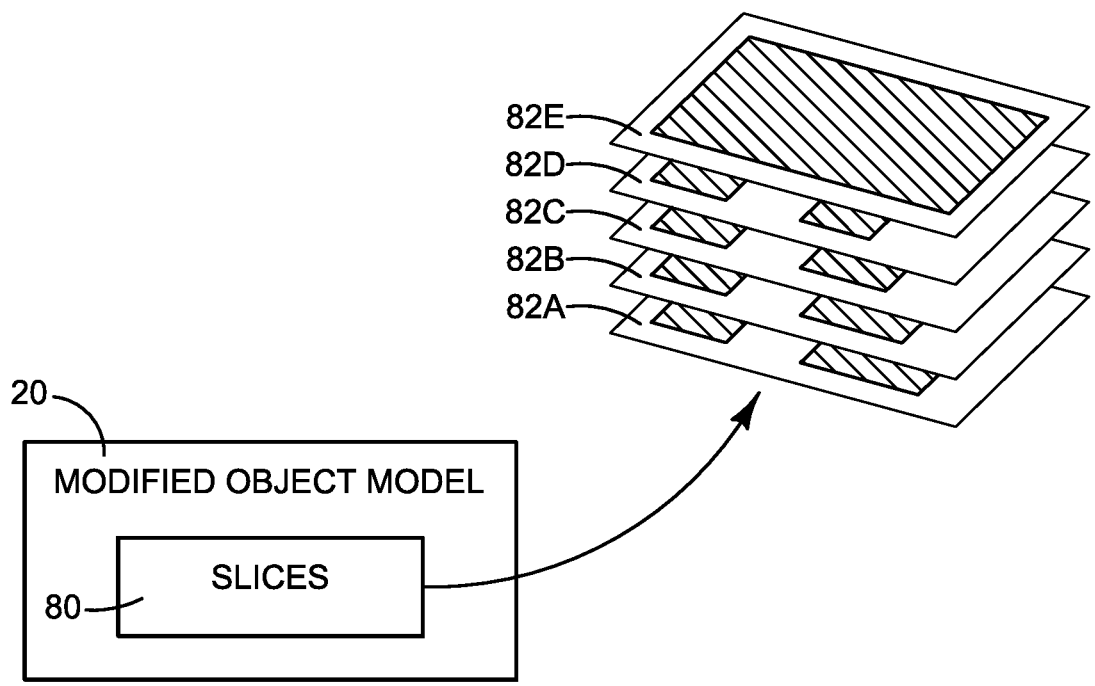
FIG. 9 illustrates an example modified object model with object slices to print a structure shown in FIGS. 4-6.
Figure 10:
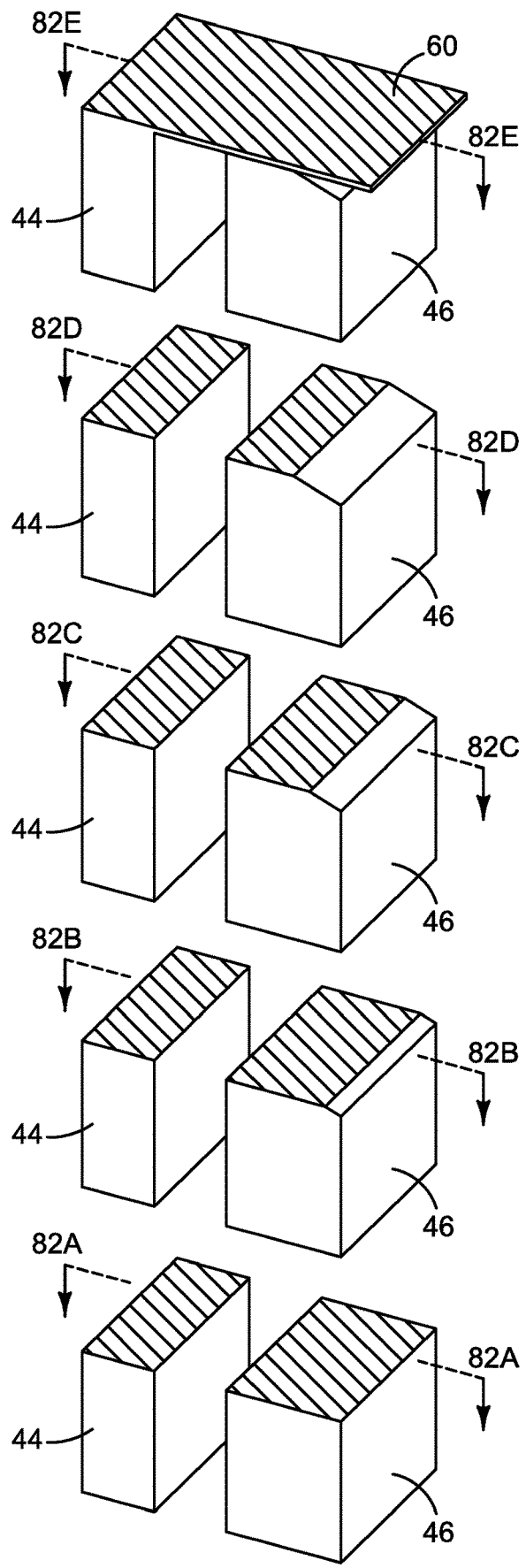

FIG. 10 presents a series of sections corresponding to the slice images in the example object model shown in FIG. 9.

FIG. 11 illustrates an example method for modifying an object model to generate slices to print breakaway force concentrating grooves.

FIGS. 12-17 illustrate other example object structures with a breakaway support.

The Same Part Numbers Designate the Same or Similar Parts Throughout the Figures. The Figures are not Necessarily to Scale.

DESCRIPTION

Metal objects may be produced, for example, by selectively applying a liquid binder agent to portions of each of successive layers of metal powder to bind together those portions of the powder corresponding to the solid layer of the 3D object. The binder agent is dried or otherwise cured, for example using heat and/or ultra violet energy. The cured object, known commonly as a "green part", is heated in a sintering furnace to burn off any residual binder and fuse the metal. Structures may be formed with the green part for support during sintering to prevent the part from tipping and/or to inhibit sagging of overhangs and other spans that are otherwise inadequately supported within the object itself. The support structures are separated from the object after fusing, usually by breaking the supports away from the object.

A new support structure has been developed to concentrate the breakaway force for easier separation. In one example, the support structure includes a wedge shaped groove between the object and the support. The groove narrows to a line along which an inner portion of the support intersects the object. The groove concentrates the breakaway force along the line of intersection to reduce the force needed to initiate separation. Also, the line of intersection at the base of the groove forms a nascent crack to more consistently initiate separation at the desired location and for cleaner separation, particularly for a unified structure in which each support is printed from the same material as the object with no intervening separation layer. Although a straight groove may be used, a wedge shaped groove facilitates removing powder from the groove before sintering.

An object model for printing a force concentrating, breakaway support structure may be generated, for example, by modifying the object model to include supports and grooves (or other force concentrating features) based on the geometry of the object, characteristics of the build material, the precision of the printer, the desired breakaway force and any other relevant parameters. Object model analysis and modeling for breakaway supports may be implemented through programming on the printer controller, by an object model processor distinct from the printer controller, or as part of the original object model using 3D modeling software adapted to create the new support structures.

Examples of the new structures are not limited to metal or ceramic "green parts" sintered/fused after printing, but may be used with polymers and other materials fused during printing. Also, although examples are described with reference to force concentrating grooves, other breakaway force concentrating features are possible. Accordingly, the examples described herein illustrate but do not limit the scope of the patent which is defined in the Claims following this Description.

As used in this document, "and/or" means one or more of the connected things; a "memory" means any non-transitory tangible medium that can embody, contain, store, or maintain information and instructions for use by a processor and may include, for example, circuits, integrated circuits, ASICs (application specific integrated circuits), hard drives, random access memory (RAM), read-only memory (ROM), and flash memory; and a "span" means any part of an object supported by, or to be supported by, a breakaway support during printing or post print processing.

Figure 1:
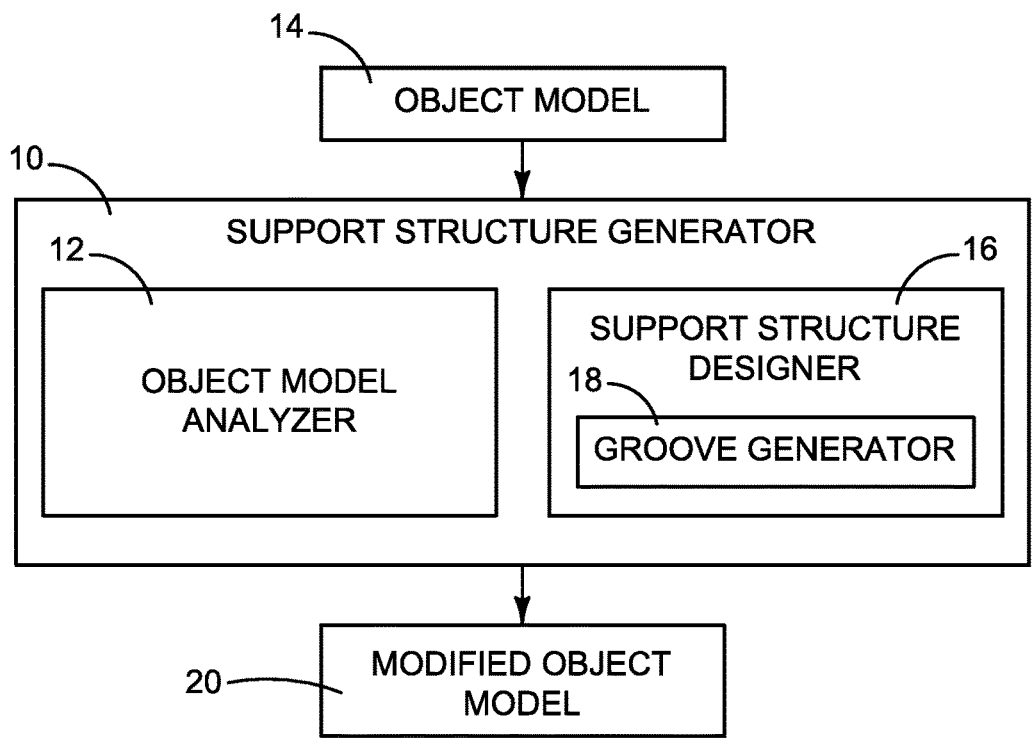
FIG. 1 illustrates an example support structure generator to generate a digital representation of breakaway supports and corresponding grooves or other breakaway force concentrating features.

FIG. 1 illustrates one example of a support structure generator 10 to generate a digital representation of breakaway supports and corresponding grooves or other breakaway force concentrating features. Generator 10 may be implemented, for example, through programming on a printer controller, an object model processor separate from the printer controller, or as part of a 3D modeling program. Generator 10 includes an object model analyzer 12 to analyze an object model 14. Object model analyzer 12 may, for example, analyze object model 14 to determine the intended orientation of the object during printing, post print sintering, and/or other post print processing, and then determine breakaway supports for parts of the object in one or multiple intended orientations.

Support structure generator 10 also includes a support structure designer 16 to design support structures to be added to object model 14 based on analyses by object model analyzer 12. Designer 16 includes a groove generator 18 to generate a force concentrating groove or multiple grooves for each breakaway support in which it is determined that such a groove or grooves is desired. Generator 10 generates a modified object model 20 that may be used to print the object and support structures. A 3D printer may be controlled based on digital slices taken from the modified object model to apply a binder or fusing agent to each of successive layers of build material in a pattern corresponding to each layer/slice of the object.

Figure 2:
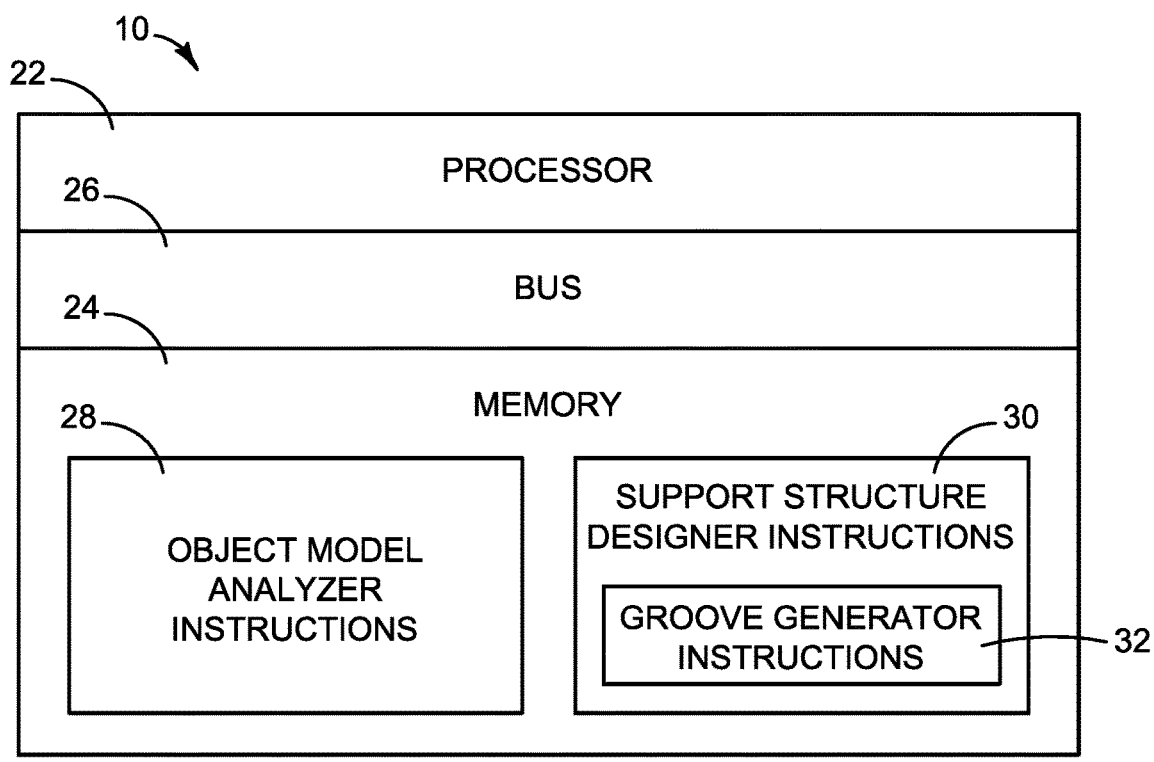
FIG. 2 illustrates an example implementation for a support structure generator shown in FIG. 1.

FIG. 2 illustrates one example implementation for a support structure generator 10 shown in FIG. 1. Referring to FIG. 2, generator 10 includes a processor 22, such as a microprocessor or microcontroller, a memory 24, and a communications bus 24 connecting processor 22 and memory 24. Memory 24 stores object model analyzer instructions 28 that, when executed by processor 22, cause the processor to analyze an object model. Memory 24 also stores support structure designer instructions 30 with groove generator instructions 32 that, when executed by processor 22, cause the processor to modify an object model to include breakaway support structures and corresponding force concentrating grooves. In one example, memory 24 with instructions 28, 30, and 32 is part of a printer controller along with processor 22 and bus 26. In another example, memory 24 with instructions 28, 30, and 32 is part of a 3D modeling program.

FIG. 3 illustrates one example of an additive manufacturing system 34 with a 3D printer 36 to print green parts and a sintering furnace 38 to sinter the green parts. Referring to FIG. 3, in this example printer 36 is implemented as a binder jet type 3D printer for printing green parts 42 through the application of a liquid binder to each of successive layers of powdered build material. Printer 36 includes a build chamber 40 in which the green parts are printed. In the example shown in FIG. 3, each green part is printed as unified structure 42 that includes an object 44 and a support 46 integral to and made of the same material as object 44. Structure 42 is described in more detail below with reference to FIGS. 4-6.

Structures 42 are printed on a build platform 48 that moves vertically in chamber 40 to accommodate the formation of each successive layer of powdered build material 50 by a layering system 52. Once a layer of build material has been printed, the build platform is lowered a distance corresponding to the thickness of the next layer of build material to be formed atop the previous layer. Any suitable build material powder 50 may be used including, for example, metals, ceramics, and polymers. A layering system 52 may include, for example, a roller, wiper, blade or any other mechanism suitable for forming layers of build material over platform 48.

Printer 36 in FIG. 3 includes an agent applicator 54 to selectively apply a liquid binder to individual layers of build material in a desired pattern based on the modified object model 20 (FIG. 1). Agent applicator 54 may be implemented, for example, as an inkjet printhead or an array of multiple inkjet printheads. In this example, printer 36 also includes an energy source 56 to dry and/or cure the binder to form green parts 42. The green parts are transferred from build chamber 40 to sintering furnace 38 to fuse the green material for the completed object. Supports 46 are broken away from objects 44 after sintering.

A controller 58 in FIG. 3 includes the programming, processing and associated memory resources, and the other electronic circuitry and components to control the operative elements of printer 36. In particular, controller 58 may include programming to modify the object model to print force concentrating grooves for the breakaway supports. Groove programming may be implemented in controller 58, for example, through a memory 24 with groove generator instructions 32 and a processor 22 to execute instructions 32, as described above with reference to FIG. 2. Controller 58 may also include object model analyzer instructions 28 and support structure designer instructions 30 shown in FIG. 2.

FIGS. 4 and 5 illustrate one example of an object structure 42 with an object 44 and a breakaway support 46. Structure 42 may be a green part or a fully fused part before breaking away the support. Object 44 includes a span 60 supported by support 46. In this example, span 60 is an overhang. Structure 42 includes a groove 62 between object 44 and support 46. In this example, groove 62 is a wedge shaped groove that ends at a line 64 along which an inner portion of support 46 intersects span 60. Also in this example, groove 62 is defined by a bevel 66 along a top part of support 46 and a flat 68 (not beveled) along a bottom part of span 60. FIG. 6 shows support 46 breaking away from object 44 at the urging of a breakaway force 70 applied to the bottom part of support 46.

Figure 7:
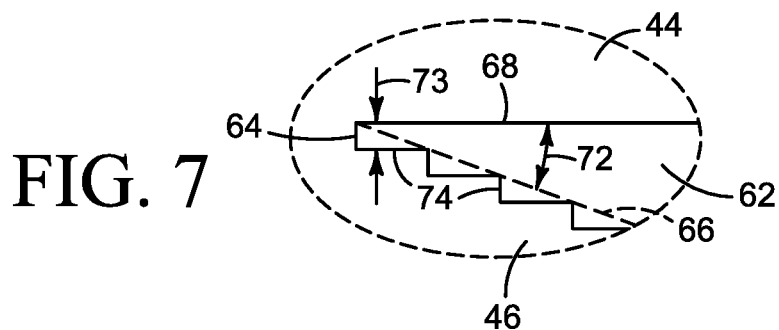
FIGS. 7 and 8 are details from FIGS. 5 and 6, respectively.

Referring to the detail of FIG. 7, the breadth 73 of the physical line 64 along which along which an inner portion of support 46 intersects span 60 is the printed equivalent of at least one voxel. Unlike a mathematical line, a physical line necessarily has breadth. The breadth of a printed voxel depends on the precision of the 3D printer. Thinner layers of build material and higher resolution agent applicators may be used to produce a narrower voxel and thus a sharper line 64. Similarly, the angle 72 of bevel 66 with respect to flat 68 is approximated by a series of tiny steps 74 along support 46. Unlike milling machines and other subtractive analog manufacturing tools, 3D printers may not be able produce a continuous, smooth bevel. 3D printing is additive and digital. Consequently, a bevel is approximated by applying a binder or fusing agent digitally, voxel by voxel, turning the applicator on and off to apply the desired pattern of agent to each of successive layers of build material, producing steps 74 shown in FIG. 7. Thinner layers of build material and higher resolution agent applicators may be used to produce a better approximation of a smooth, continuous bevel.

Groove 62 concentrates the breakaway force 70 along line 64 to reduce the force to initiate a break between support 46 and from object 44. A groove 62 may be designed to initiate the break at a force 70 (FIG. 6) below a threshold force when force 72 is exerted on support 46. In addition, groove 62 may be designed to facilitate removing powder from the groove. Although a straight groove may be used to achieve the desired breakaway force, a wedge shaped groove facilitates removing powder from the groove while still allowing a narrow line of intersection 64. This is particularly desirable for green parts, which are depowdered before sintering. Any significant amount of powder in a groove 62 may become fixed and attached to the surrounding parts, causing a larger breakaway force and less clean fracture line.

Figure 8:
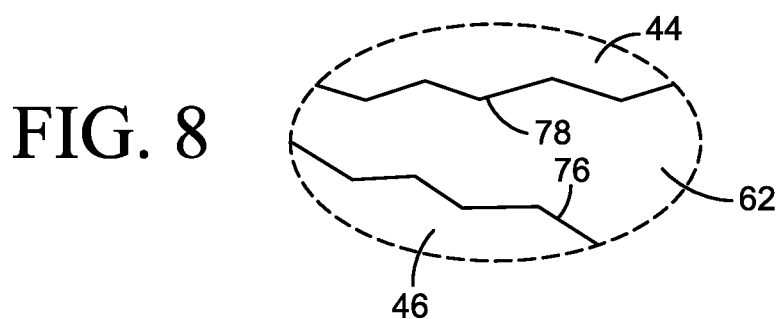

The detail of FIG. 8 shows one example of fracture lines 76, 78 as support 46 breaks away from object 44. The smoothness of fracture lines 76, 78 may depend on the characteristics of the material forming support 46 and object 44 as well as the breadth of line 64 and any unwanted powder remaining in groove 62.

FIG. 9 illustrates a modified object model 20 with object slices 80 to print a structure 42 shown in FIGS. 4 and 5. Slices 80 may be part of the modified object model, as shown in FIG. 9, or object slices 80 may be generated separately from the modified object model, for example by a 3D printer controller or by an object model processor distinct from the printer controller. Object slices 80 represent multiple digital slices used to print corresponding layers of the structure, as indicated by slice images 82A-82E in FIG. 9. Slice images 82A-82E in FIG. 9 correspond to layers 82A-82E in structure 42 shown in FIG. 10.

FIG. 11 illustrates one example of a method 100 for modifying an object model to generate slices 80 shown in FIG. 9, to print a force concentrating groove 62. Method 100 may be implemented, for example, by a support structure generator 10 shown in FIG. 1. Part numbers in the description of method 100 refer to FIGS. 4-10. Referring to FIG. 11, the object model is analyzed to identify any spans 60 in object 44 (block 102). Support(s) 46 and groove(s) 62 are designed for each span to achieve the desired breakaway forces (block 104). The object model is modified to include the support(s) and groove(s) (block 106). Object slices are generated within the modified object model, or separately based on the modified object model, with each slice defining those portions of a layer of build material to be printed to form a structure 42 that includes an object 44, support(s) 46, and groove(s) 62 (block 108).

The design of each support and corresponding groove (or grooves) may include the size, shape and location of the support as well as the features that will be printed to define each groove. For example, the modified object model may define the length and angle of a bevel 66 along support 46 and a flat 68 along object 44. The modified object model may also set the resolution for printing steps 74, and thus the breadth of line 64 and smoothness of angle 72, based on the characteristics of the build material, the thickness of each layer of build material, the precision of the agent applicator, and the desired breakaway force. Printers with higher resolution and thus more precise applicators and that are able to form thinner layers may print narrower lines 64 and smoother bevels 66.

Figure 12:
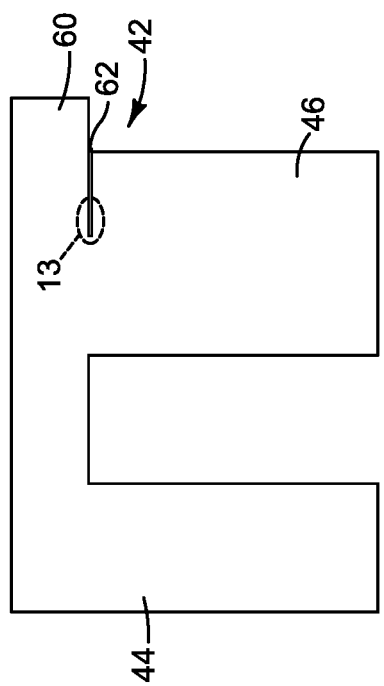
Figure 13:
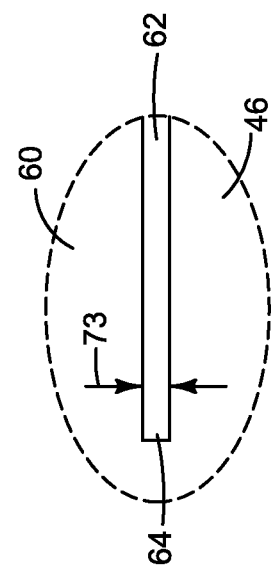

FIGS. 12 and 13 illustrate another example of an object structure 42. Referring to FIGS. 12 and 13, a straight groove 62 ends at the line of intersection 64 between support 46 and span 60. The breadth 73 of groove 62 may be as narrow as one voxel for a lower breakaway force and a cleaner break. A broader groove 62, however, may desirable in some implementations to facilitate removing powder from the groove.

Figure 14:
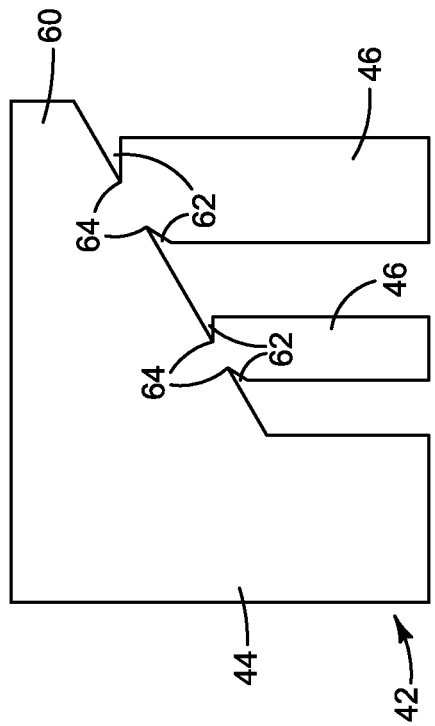

In the example shown in FIG. 14, structure 42 includes multiple supports 46 supporting a tapered span 60 along a slope of the taper. Structure 42 includes grooves 62 at each side of each support 46.

Figure 15:
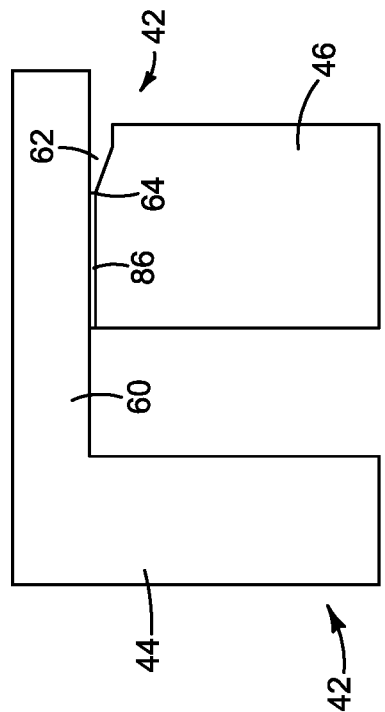

In the example shown in FIG. 15, an interface 86 is interposed between object 44 and support 46. Groove 62 ends at a line 64 along which the inner portion of support 46 intersects interface 86. Interface 86 further reduces the breakaway force and helps make a cleaner break. Examples of an interface 86 are disclosed in international application no. PCT/US2018/029968 filed Apr. 27, 2018 and titled SUPPORT STRUCTURES AND INTERFACES. In one example, an interface 86 is printed by applying an interface agent that forms a localized weaker region of build material between object 44 and support 46. Depending on the type of interface agent, the physical properties of interface 86 may differ from those of object 44 and support 46. For example, some interface agents may include ceramic nanoparticles that weaken the interface between object 44 and support 46 during binding or fusing. For another example, some interface agents may include chemicals that create gas pockets between object 44 and support 46 during binding or fusing to weaken the interface.

Figure 16:
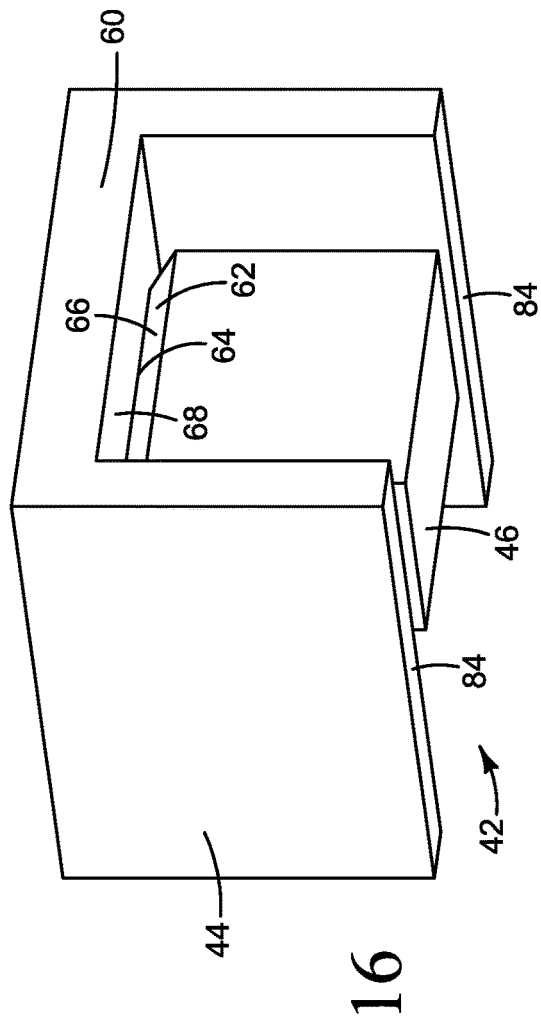
Figure 17:
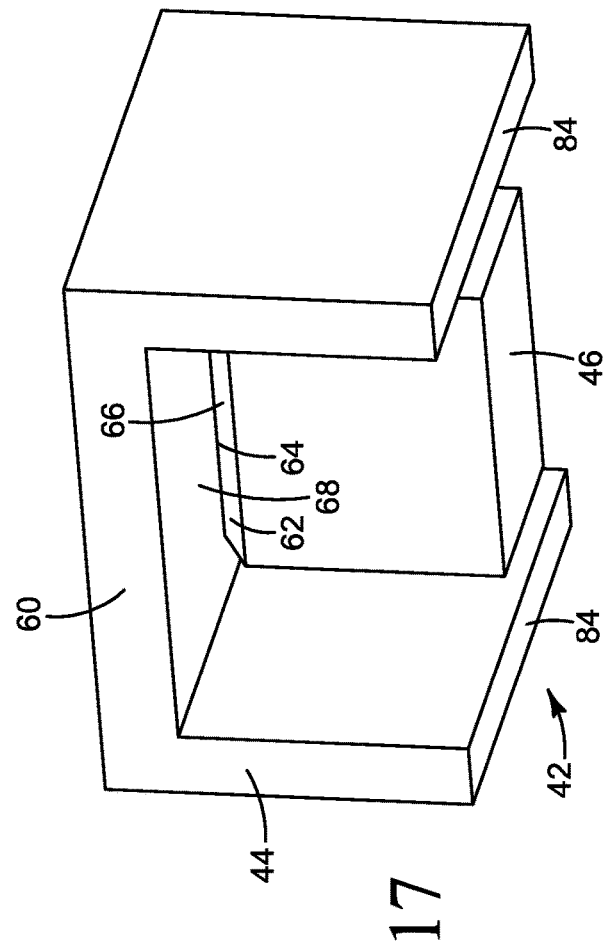

Referring now to FIGS. 16 and 17 illustrating another example of an object structure 42. In this example, span 60 extends between parts 84 of object 44 and structure 42 includes a groove 62 at each side of support 46. A breakaway force may be applied to either side of support 46 to initiate a break at the corresponding line 64. The opposite groove 62 may also help support 46 separate more cleanly from object 44.

As noted at the beginning of this Description, the examples shown in the figures and described above illustrate but do not limit the scope of the patent. Other examples are possible. Therefore, the foregoing description should not be construed to limit the scope of the patent, which is defined in the following Claims.

"A" and "an" as used in the Claims means one or more.

The invention claimed is:

1. A 3D printing system, comprising:
a support structure generator to identify a breakaway support to support part of an object, to design a wedge shaped groove between a portion of the object and the support, the groove ending at a line along which the support intersects and is integral or directly connected to the object, and to generate a digital object model that includes the support and the groove; and
a 3D printer to print the object, support and groove based on the object model.

2. The system of claim 1, comprising a slicer to generate multiple slices from the object model with each slice defining those portions of a layer of build material to be printed to form the object, support and groove.

3. The system of claim 2, wherein the slicer is implemented in a controller for the 3D printer or in an object model processor separate from the printer controller.

4. A non-transitory computer-readable medium storing instructions that, when executed by a processor, cause a 3D printing system to:
analyze a digital model of an object;
identify a breakaway support to support part of the object;
design a structural feature, including a wedge shaped groove, to concentrate a breakaway force along a line where the support intersects and is integral or directly connected to the object;
modify the digital object model to include the support and the structural feature; and
print the object, support and groove based on the modified digital object model.

5. The non-transitory computer-readable medium of claim 4, wherein the instructions, when executed by the processor, further cause the 3D printing system to generate multiple slices based on or within the modified digital object model, with each slice defining those portions of a layer of build material to be printed to form the support and the structural feature.

6. The non-transitory computer-readable medium of claim 4, wherein the instructions, when executed by the processor, further cause the 3D printing system to:
design the breakaway support integral to the object; and
design, as the structural feature, the wedge shaped groove between a portion of the object and the support, the groove ending at the line along which the support intersects and is integral or directly connected to the object.

7. The non-transitory computer-readable medium of claim 4, wherein the non-transitory computer-readable medium is a memory residing on a 3D printer controller including the processor.

8. A process for 3D printing an object, comprising:
identifying a span;
designing a breakaway support to support the span;
designing a wedge-shaped groove to concentrate a breakaway force along a line where the support intersects the span and is integral or directly connected to the span;
generating digital object slices to print the span, support, and groove;
printing the object using the digital object slices.

9. The process of claim 8, further comprising:
analyzing a digital model of the object to identify the span;
modifying the object model to include the support and the wedge-shaped groove; and
generating the digital object slices using a modified object model.

10. A physical object comprising:
a span;
a breakaway support to temporarily support the span; and
a structural feature, including a wedge shaped groove, to concentrate a breakaway force along a line where the support intersects the span and is integral or directly or directly connected to the span.

11. The physical object of claim 10, wherein the wedge shaped groove is between a portion of the span and the support, the groove narrowing to the line along which an inner portion of the support intersects the span.

12. The physical object of claim 11, wherein the wedge shaped groove is configured to initiate a break along the line in response to a force, below a threshold force, exerted on the breakaway support.

* * * * *